C. A. ROBINSON.
GROUND SURFACING APPARATUS.
APPLICATION FILED APR. 6, 1915.
1,167,112.
Patented Jan. 4, 1916.
3 SHEETS—SHEET 1.
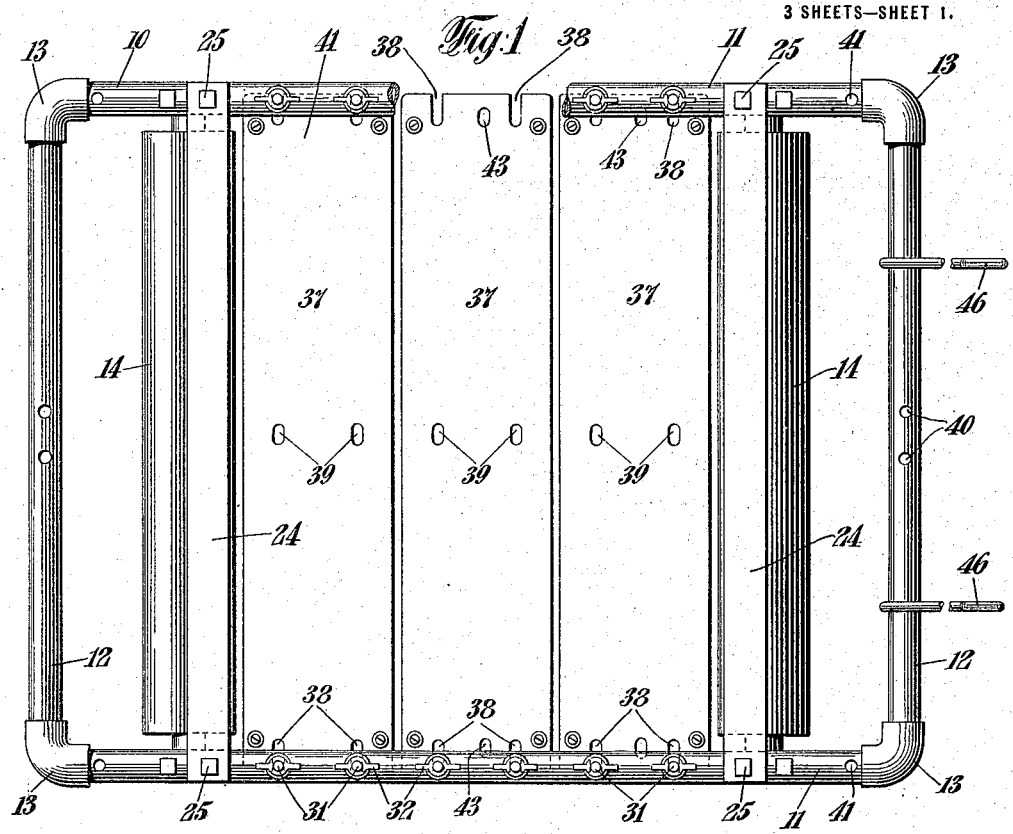
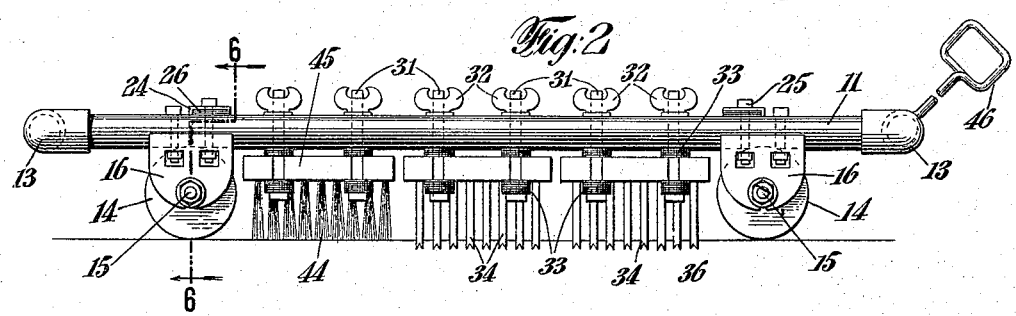
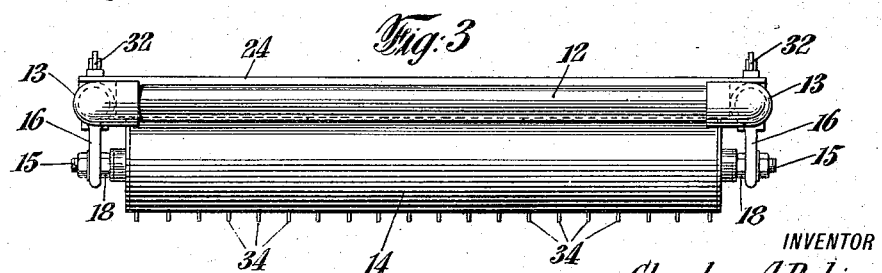
BEST AVAILABLE COPY
INVENTOR
Charles A. Robinson
BY
John R. Nolan
ATTORNEY

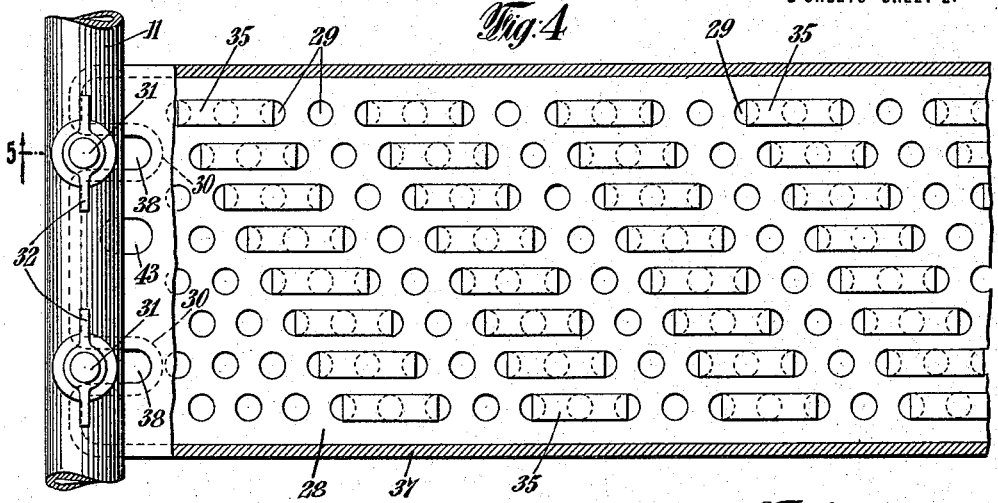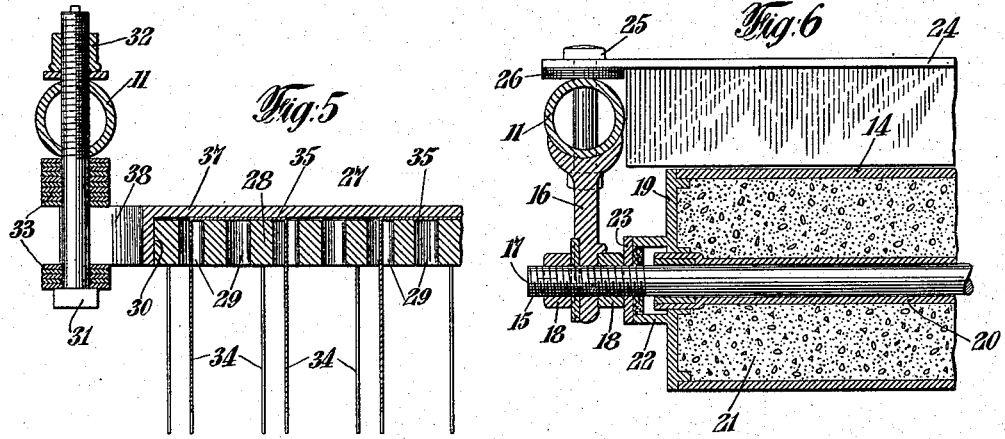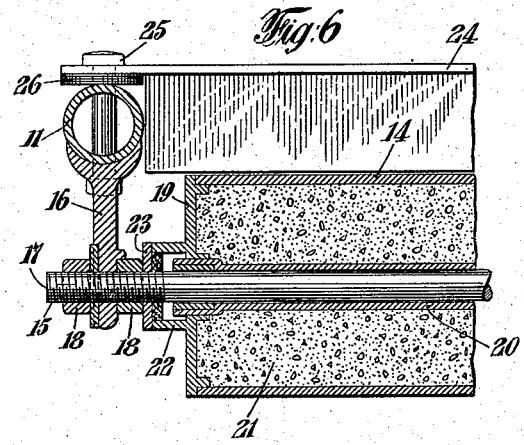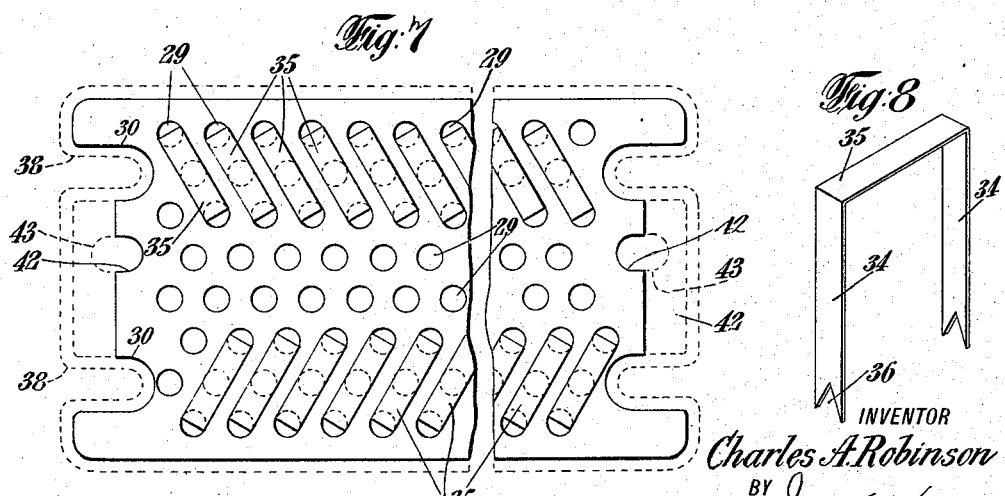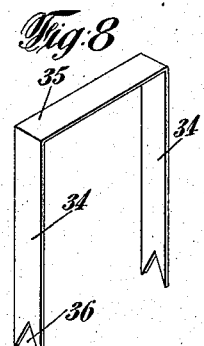

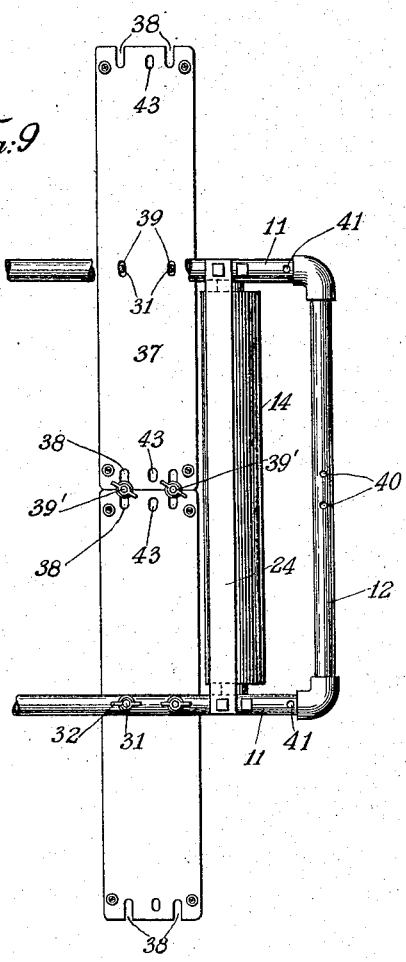
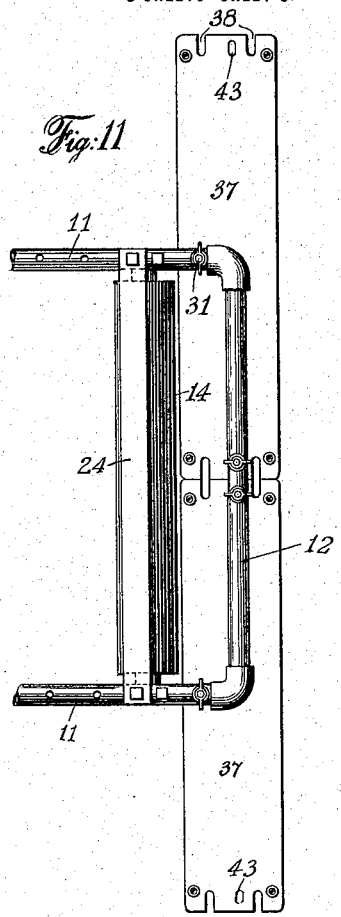
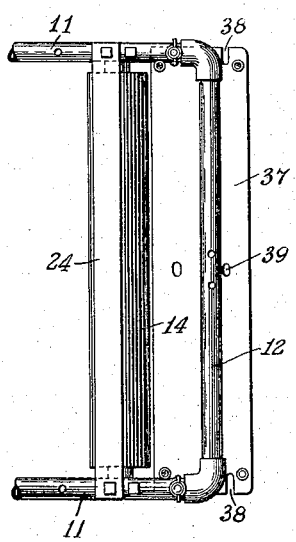
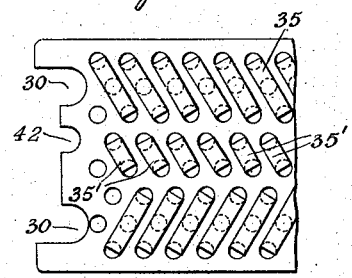

UNITED STATES PATENT OFFICE.

CHARLES A. ROBINSON, OF EAST ORANGE, NEW JERSEY.

GROUND-SURFACING APPARATUS.

1,167,112.   Specification of Letters Patent.   Patented Jan. 4, 1916.

Application filed April 6, 1915. Serial No. 19,606.

*To all whom it may concern:*

Be it known that I, CHARLES A. ROBINSON, a citizen of the United States, and resident of East Orange, in the county of Essex and State of New Jersey, have invented certain new and useful Improvements in Ground-Surfacing Apparatus, of which the following is a specification.

This invention concerns an apparatus for leveling and smoothing large areas of ground; the same being especially, though not exclusively, designed for surfacing the grounds of tennis courts.

The object of my invention is to provide a simple, durable and efficient apparatus of the kind mentioned which can be operated with facility by one or two persons, and which can be readily adjusted to meet various requirements and conditions of service.

In the form of embodiment of my invention herein illustrated, I employ a substantial frame structure which is supported on suitable rollers and is equipped with adjustable ground breaking, leveling and smoothing devices, the whole being so constructed and organized that the area of ground traversed by the machine is uniformly scarified; clods of earth are reduced and uniformly distributed, and the ground is effectually leveled and rolled to present a smooth and finished surface.

The invention also comprises various features of construction and combinations of parts which will be hereinafter particularly described and claimed.

In the drawings—Figure 1 is a plan of an apparatus embodying a preferred form of my invention, one of the side rails of the supporting frame being partly broken away to show parts otherwise concealed. Fig. 2 is a side elevation of the apparatus. Fig. 3 is an end view. Fig. 4 is a partial plan of one of the breaking and leveling structures; a superposed cap or cover plate for such body being shown partly in section, and a part of the supporting frame and the adjustable connections between the same and the structure being indicated. Fig. 5 is a vertical section, as on the line 5—5 of Fig. 4. Fig. 6 is a vertical section through one side of the frame and the adjacent end of the roller, as on the line 6—6 of Fig. 2. Fig. 7 is a plan of one of the breaking and leveling structures, showing a possible position of angular adjustment of the staple-like devices therein. In this view the cover is indicated in dotted lines. Fig. 8 is a perspective view of one of the said devices. Fig. 9 is a plan of one end of the apparatus showing two breaking and leveling structures arranged end to end and bolted to the side bars of the supporting frame; one of said bars being partly broken away to show the proximate bolt holes of the adjacent structure. Fig. 10 is a similar view showing one of the structures fastened at the end of the supporting frame, outwardly beyond the roller. Fig. 11 is a similar view showing two structures arranged end to end outwardly beyond the roller. Fig. 12 is a plan of a portion of the structure showing several narrow staple-like devices inserted into pairs of adjacent holes in the body of the structure.

Referring to the drawings, 10 designates a rectangular frame structure constructed preferably of spaced side and end pipe sections 11, 12 respectively, connected by corner-fittings 13; and 14 designates two relatively heavy rollers mounted to rotate on axles 15 which are supported at their ends in depending brackets 16 bolted to the frame sides adjacent to the respective ends of the structure. The ends of each axle are extended through slots in the hangers and are screw-threaded, as at 17, for the reception of clamp-nuts 18, which, taking against the opposing inner and outer sides of the respective hangers, secure the axle thereto in a manner to augment the strength and rigidity of the structure.

Each of the rollers 14 comprises a hollow metal cylinder provided with end heads 19 which are rigidly connected by a central tube 20, which has a brass bushing at each end for a bearing; the cylinder being loaded with a heavy mass of material 21, such as concrete, in order that the roller shall possess the requisite weight. The axle 15 extends freely through the central tube, to leave sufficient room for a quantity of lubricant, and each of the heads is preferably provided with a central hub portion 22, inside of which is a leather or composition washer to prevent the escape of the lubricant from and the entrance of dust to the axle bearing. Against the open end of the hub is a metal washer, as 23, to receive the wear of the contiguous nut on the axle.

A scraper 24 contacts with the surface of each roller to keep it clear of adhering clay. This scraper preferably comprises a bar of angle-iron held in position on the frame by the bolts 25 that secure the hangers to the frame; the acting edge of the bar being appropriately ground to accord with the curvature of the roller. Means, such as thin washers 26 on the fastening bolts, are provided to permit adjustment of the scraper in respect to the roller surface, as need may require.

27 designates vertically-adjustable ground-working structures which are supported by the frame. In the present instance there are two of such structures. Each includes a rectangular body 28, of wood or other suitable material, provided with staggered rows of transverse perforations 29 and with end recesses 30. These recesses, of which in the present instance there are two at each end of the body, are appropriately formed to receive the lower headed portions of vertically-disposed suspension bolts 31 which, passing up through holes in the adjacent side rails of the frame, are provided at their screw-threaded upper ends with wing nuts 32. On each of the bolts are disposed below and above the adjacent recessed part of the body, spacing washers 33 which afford a simple and efficient means whereby vertical adjustment of the body can be accomplished.

Depending from the body 28 is a gang of ground breaking and leveling devices each of which in the present instance comprises the vertical legs 34 of a staple-shaped member 35 of relatively-thin tempered spring steel, the free extremities of such legs being pointed, as at 36. The holes in the body are circular and of uniform diameter, and the material comprising the said devices is substantially equal in width to such diameter; the legs being so spaced apart relatively to the spacing of the holes, that such legs may be inserted through predetermined holes so as to occupy various angular positions in relation to the path of movement of the apparatus; or in other words, the devices may be set parallel with the length of the body so as to present the thin cutting edges of the legs to the working path as indicated in Fig. 4, or the devices may be angularly disposed on the body so as to present the faces of the legs diagonally to such path as indicated in Fig. 7. For scratching and breaking the ground the depending devices are arranged as shown in Fig. 4; but for leveling loose ground they are arranged as shown in Fig. 7. The said devices when they are properly applied to the body are firmly held in place by an iron cap or cover plate 37 which is placed on and secured to the body. The plate is provided with appropriate side and end flanges, the latter having therein suitably-disposed sockets 38 which register with the recesses in the proximate ends of the body. The bolts 31, passing through the sockets of the cover, effectually lock the plate upon the body.

By dividing the upper and lower space washers 33 on the bolts 31, at the respective ends of the structure just described, such structure can be nicely adjusted vertically so that the breaking and leveling devices thereof will penetrate the ground to any desired extent (say, from a sixteenth to three-quarters of an inch) during the travel of the apparatus. If any of such devices should bend or break or become dull from contact with firmly embedded stones, it or they can be quickly removed and replaced by new ones; it being merely required to remove the cover-plate, withdraw the defective device or devices, insert a new or repaired device or devices, and then re-apply the cover-plate. Such replacements will be few, however, because the flexible legs of the devices when they impinge against embedded stones, generally spring sidewise, slip past the same, and resume their normal position. The legs being thin, smooth, flexible and comparatively far apart, clay does not stick to and clog them.

I usually provide a number of devices of narrower width (i. e. with legs closer together) than those above described, which narrower devices are designed to be inserted into pairs of adjacent unfilled holes, and thus supplement the larger devices in the performance of the breaking and leveling operations as, for example, when the ground is dry enough not to clog the closely set legs. Several of these supplemental devices are illustrated at 35' in Fig. 12 as applied to one of the breaking and leveling structures. Apart from their narrower width the devices 35' are each identical in form with the device 35 shown in Fig. 8.

I preferably equip the apparatus with two ground-working structures of the character described, either or both of which may be adjusted to operative position in relation to the surface of the ground, as occasion may require.

If the devices be assembled in the staggered relation shown in Fig. 4, with their thin edges presented to the opposing soil, one structure will effectually penetrate and tear up a surface of fairly dry earth in a single passage of the machine. In that case the other structure will be out of action. If, however, owing to the condition of the soil the single structure be ineffective, both structures may be brought into operation with their respective devices so disposed that the tracks of one set will alternate with those of the other set and accordingly increase the breaking and tearing effect on the earth. In order that the said structures may be placed end to end across the path of the apparatus, and thus act upon a wide swath of ground, if desired, I provide each body (and cover plate), midway between its ends with elongated holes 39 which, when the structures are disposed with their abutting ends at the median line of the machine, are in vertical alinement with the adjacent bolt holes in the side bars. The bolts are passed upward through the alining holes of the bodies and side bars and the fastening nuts applied to the upwardly projecting ends of the bolts; the washers being used on the bolts, as before, for adjusting purposes. The contiguous ends of the structures are fastened together by short bolts 39' passed through the opposed recesses. (See Fig. 9.)

If it be desired to loosen up the surface of the ground without rolling it, the said structures, either singly or end to end, may be fastened at the end or ends of the supporting frame, outside of the rollers. For this purpose the end bars and the side bars are provided with suitably-disposed bolt holes 40, 41 respectively, and the body and cap plate of each structure are provided at each end with a suitably-disposed registering recess 42 and slot 43 respectively. When one of the structures is placed at the end of the frame outwardly beyond the adjacent roller, end recesses of the body of such structure register with the bolt holes 41 and thus the structure can be readily positioned and secured to the frame by the application of the bolts and associated space washers. (See Fig. 10.) When the structures are placed end to end, at one end of the frame beyond the roller, the mated recesses 42 and slots 43 of the abutting ends of the two structures register with the respective holes 40 in the end bar of the frame, and one of the elongated holes 39 of each of the structures registers with the hole 41 of the adjacent side bar. (See Fig. 11.) Thus the structures can be readily bolted to the frame and their position in respect to the ground can be easily adjusted by means of the space washers above described.

If it be desired to use only the rollers both structures may be adjusted to raise the ground-breaking devices from the ground.

In rear of the breaking and leveling structures is mounted a finishing brush having fiber, ratan or wire bristles 44, the brush back 45 being adjustably supported by the frame similarly to the bodies as above explained, in order that said brush may be likewise adjusted in vertical relation to the ground, as desired.

The machine above described is adapted to be drawn by one or two men. For this purpose detachable handles 46, with hook extremities, are conveniently provided. These handles may be hooked over either end of the frame, or into the holes 41 in the side bars of the frame, or over the scraper bar, as the pull or draft of the machine may require. Obviously the machine can be drawn either end foremost, and therefore it is unnecessary to turn it around after each course of travel across the area of ground being operated upon.

The apparatus may be handled with facility to perform effectually the following named steps in the preparation of the surface, for example, of a clay tennis court, viz: (1) to scarify or scratch up the surface sufficiently to obtain material for an adequate top dressing; (2) to reduce and pulverize such material; (3) to distribute the material uniformly; (4) to level and smooth the surface, and (5) to roll the surface until the requisite hardness thereof is obtained.

Preparatory to the first step of the surfacing operation, one of the breaking and leveling structures is attached to the frame outside of the rollers. If it is desirable to scarify a wider area, both structures may be similarly attached to the frame, end to end, so as to project outwardly beyond the path of the rollers, the structures in either case being adjusted vertically so that the breaking and leveling devices thereof will penetrate the ground uniformly the desired distance, depending upon the evenness of the ground. The machine is drawn the length of the court; then swung a quarter turn and drawn the width of the court; and so on progressively from end to end and side to side of the plot until the area is thoroughly scratched. If the pull or draft of the apparatus be too hard for one person with the devices penetrating the ground, say, half an inch, the ground can be gone over twice, first, with the devices set to penetrate, say, a quarter of an inch and, second, with the devices set to penetrate, say, a half inch.

Preparatory to the second step of the surfacing operation the clay is allowed partially to dry so that the lumps will be readily friable under the weight of the rollers and the action of the devices. The structures being mounted between the rollers, and their depending devices vertically adjusted to the desired extent, the apparatus is progressively drawn along and across the court.

Preparatory to the third step of the surfacing operation the depending devices are positioned so that their flat faces will be inclined to the path of travel, in which position they will scrape off the high places and fill in the hollows. With the devices thus set the apparatus is progressively drawn along and across the court. By arranging the two structures end to end as previously described, a wide track can be leveled in a single passage of the machine.

To accomplish the fourth step of the surfacing operation the devices are raised clear of the ground, the finishing brush is set at the proper level, and the apparatus is drawn along and across the plot.

To effect the final step of the surfacing operation, the devices and brush are raised above the ground, and the apparatus is weighted, as, for example, with a box of stones, and rolled upon the court. The machine is started at one corner of the court and rolled up and down lengthwise, being drawn a little on the bias each trip so that it will cover new ground each time until the entire area has been rolled. The court is then rolled cross-wise in the same manner. The load on the machine is increased and the court rolled as before; and so on the weight is increased and the rolling continued until the requisite hardness of surface has been attained.

It is to be understood that the apparatus above described may be employed for surfacing tennis courts, whether of dirt, clay or gravel, and also that it may be advantageously used wherever large areas of ground are to be leveled and smoothed.

It is also to be understood that the apparatus herein shown and described to exemplify my invention may be structurally modified without departure from the spirit of the invention.

I claim—

1. In an apparatus of the character described, a traveling support, a plurality of structures thereon comprising each a body and ground breaking and leveling devices depending therefrom, and means whereby said structures may be separately attached to said frame, either side by side, or end to end, as desired.

2. In an apparatus of the character described, a traveling support, a plurality of structures thereon comprising each a body and ground breaking and leveling devices depending therefrom, and means whereby said structures may be separately attached to said frame, either side by side, or end to end, as desired, said means including devices whereby said structures may be vertically adjusted independently of each other in either of their positions of attachment to the frame.

3. In an apparatus of the character described, a frame, rollers at the front and rear thereof, a plurality of ground breaking and leveling structures, and means whereby said structures may be separately attached to said frame, either side by side or end to end, as desired.

4. In an apparatus of the character described, the combination with a traveling support, of a structure thereon comprising a body and blades of thin flat spring material depending from said body, said blades being adjustable edgewise in respect to the cutting path without changing the horizontal level of the lower extremities of the blades.

5. In an apparatus of the character described, the combination with a traveling support, of a structure thereon comprising a body having a multiplicity of rows of holes therein in spaced relation to each other and plural legged ground breaking and leveling devices extending downwardly through and below spaced holes of the body.

6. In an apparatus of the character described, the combination with a traveling support, of a structure thereon comprising a body having a multiplicity of holes therein and plural legged devices of thin flat spring metal extending downwardly through and below spaced holes of the body.

7. In an apparatus of the character described, the combination with a traveling support, of a structure thereon comprising a body having a multiplicity of holes therein and plural-legged devices of thin flat spring metal extending downwardly through and below spaced holes of the body, the lower extremities of the legs or blades of said devices being pointed.

8. In an apparatus of the character described, the combination with a frame, of a structure thereon comprising a body having a multiplicity of holes therein, plural-legged ground breaking and leveling members extending downwardly through and below spaced holes of the body and a detachable cover-plate for said body, and means for securing said structure to the frame.

9. In an apparatus of the character described, the combination with a frame, of a structure thereon comprising a body having a multiplicity of holes therein, plural-legged ground breaking and leveling members extending downwardly through and below spaced holes of the body, and a detachable cover-plate for said body, and means connecting the body and the cover plate to the sides of the frame.

10. In an apparatus of the character described, the combination with a traveling support, of a structure thereon comprising a body having therein a multiplicity of rows of circular holes of uniform diameter, and plural legged devices extending through spaced holes of the body, said devices comprising material substantially equal in width to the diameter of each of the holes.

11. In an apparatus of the character described, a frame having parallel side bars with bolt holes therein in spaced relation to each other, and ground breaking and leveling structures having correspondingly spaced end apertures which register with the bolt holes of the respective side bars when the structures are arranged side by side so as to extend across the frame, said structures also having midway between their ends apertures which register with the bolt holes of the proximate side bars when the structures are arranged end to end, together with securing bolts for application to the said bolt holes and the said apertures in registry therewith.

12. In an apparatus of the character described, a frame having parallel side bars with bolt holes therein in spaced relation to each other, and ground breaking and leveling structure having correspondingly spaced end apertures which register with the bolt holes of the respective side bars when the structures are arranged side by side so as to extend across the frame, said structures also having midway between their ends apertures which register with the bolt holes of the proximate side bars when the structures are arranged end to end, together with securing bolts for application to the said bolt holes and the said apertures in registry therewith, and spacing washers on said bolts for vertically adjusting the structures.

13. In an apparatus of the character described, a frame, rollers at the front and rear thereof, a plurality of ground breaking and leveling structures, means for adjustably connecting said structures to the frame, a brush structure, and means for adjustably connecting said brush structure to the frame, whereby the said structures may be vertically adjusted independently of each other.

Signed at New York in the county and State of New York this 3d day of April, A. D. 1915.

CHARLES A. ROBINSON.

Copies of this patent may be obtained for five cents each, by addressing the "Commissioner of Patents, Washington, D. C."